US012400635B2

(12) United States Patent

Ding et al.

(10) Patent No.: US 12,400,635 B2
(45) Date of Patent: Aug. 26, 2025

(54) TEXT-TO-SPEECH SYNTHESIS METHOD, ELECTRONIC DEVICE, AND COMPUTER-READABLE STORAGE MEDIUM

(71) Applicant: UBTECH ROBOTICS CORP LTD, Shenzhen (CN)

(72) Inventors: Wan Ding, Shenzhen (CN); Dongyan Huang, Shenzhen (CN); Zehong Zheng, Shenzhen (CN); Linhuang Yan, Shenzhen (CN); Zhiyong Yang, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 206 days.

(21) Appl. No.: 18/212,140

(22) Filed: Jun. 20, 2023

(65) Prior Publication Data

US 2023/0410791 A1 Dec. 21, 2023

(30) Foreign Application Priority Data

Jun. 21, 2022 (CN) ......................... 202210704382.0

(51) Int. Cl.
*G10L 13/10* (2013.01)
*G10L 13/04* (2013.01)

(52) U.S. Cl.
CPC .............. *G10L 13/10* (2013.01); *G10L 13/04* (2013.01)

(58) Field of Classification Search
CPC .......... G10L 13/10; G10L 13/04; G10L 13/08
See application file for complete search history.

(56) References Cited

U.S. PATENT DOCUMENTS

| | | | | |
|---|---|---|---|---|
| 2001/0047260 A1* | 11/2001 | Walker | G10L 13/00 | 704/260 |
| 2009/0048843 A1* | 2/2009 | Nitisaroj | G10L 15/1807 | 704/260 |
| 2009/0281808 A1* | 11/2009 | Nakamura | G10L 13/04 | 704/258 |
| 2018/0082675 A1* | 3/2018 | Wang | G10L 13/10 | |
| 2021/0304769 A1* | 9/2021 | Ye | G10L 15/26 | |
| 2024/0233706 A1* | 7/2024 | Tan | G10L 13/047 | |

FOREIGN PATENT DOCUMENTS

| | | |
|---|---|---|
| CN | 102592594 A | 7/2012 |
| CN | 108597492 A | 9/2018 |

* cited by examiner

*Primary Examiner* — Huyen X Vo

(57) ABSTRACT

A text-to-speech synthesis method, an electronic device, and a computer-readable storage medium are provided. The method includes: obtaining prosodic pause features of an input text by performing a prosodic pause prediction processing on the input text, and dividing the input text into a plurality of prosodic phrases according to the prosodic pause features; synthesizing short sentence audios according to the prosodic phrases by performing a streamed speech synthesis processing on each of the prosodic phrases in the input text in a manner of asynchronous processing of a thread pool; and performing an audio playback operation of the input text according to the short sentence audios corresponding to the first prosodic phrase of the input text, in response to synthesizing the short sentence audio corresponding to the first prosodic phrase of the input text.

20 Claims, 8 Drawing Sheets

TEXT-TO-SPEECH SYNTHESIS METHOD, ELECTRONIC DEVICE, AND COMPUTER-READABLE STORAGE MEDIUM

CROSS REFERENCE TO RELATED APPLICATIONS

The present disclosure claims priority to Chinese Patent Application No. 202210704382.0, filed Jun. 21, 2022, which is hereby incorporated by reference herein as if set forth in its entirety.

BACKGROUND

1. Technical Field

The present disclosure relates to audio generation technology, and particularly to a text-to-speech synthesis method, an electronic device, and a computer-readable storage medium.

2. Description of Related Art

Text-to-speech (TTS) is one of the important technologies in human-machine interaction systems. The process of text-to-speech synthesis is mainly to generate speech to corresponding input text. First packet delay refers to the time interval between the input of the text to the start of playing back TTS results. At present, the existing TTS systems usually start the streaming predictions after the frontend analysis to the entire input text. The frontend analysis includes the text normalization, the phoneme prediction and the prosody prediction. In this case, since the first packet delay is the summary of the processing time of the three processing process of the text normalization, the phoneme prediction, and the prosody prediction, where each processing process needs to wait for the previous processing process to complete, which consumes much time and makes the first packet delay large, and the first packet delay will also increase as the number of the words of the text increases. If the first packet delay is large, user's product experience will be reduced due to long waiting and response time.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be understood that, the drawings in the following description merely show some embodiments. For those skilled in the art, other drawings can be obtained according to the drawings without creative efforts.

DETAILED DESCRIPTION

In order to make the objects, technical solutions and advantages of the embodiments of the present disclosure more clear, the present disclosure will be described in further detail below with reference to the drawings and the embodiments. It should be noted that the embodiments described herein are just for explaining the present disclosure, rather than limiting the present disclosure.

Figure 1:
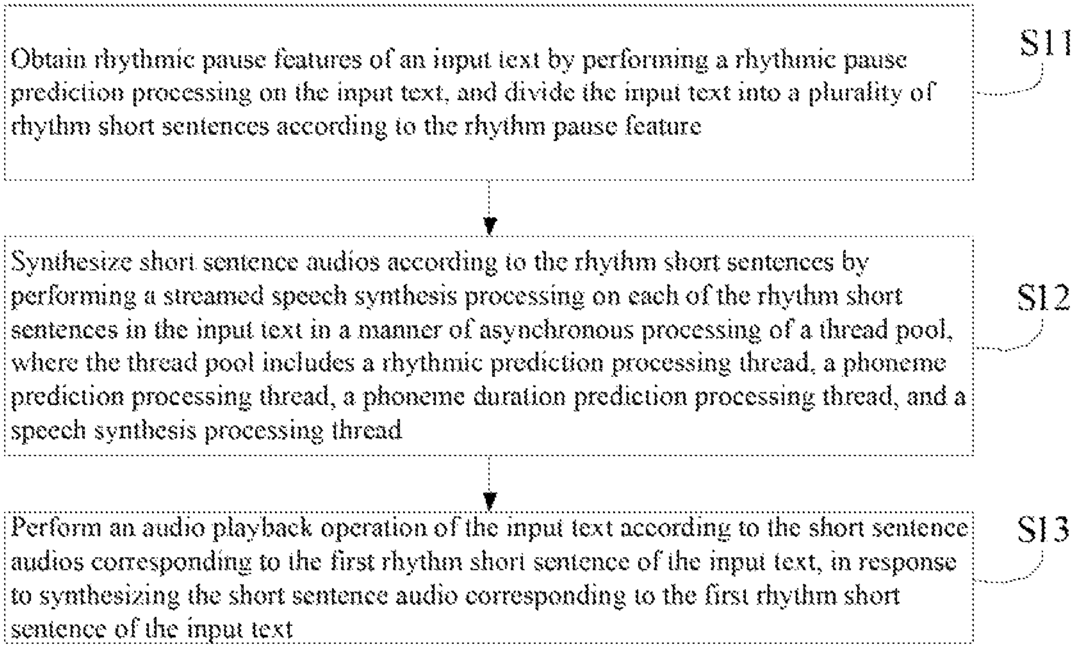
FIG. 1 is a flow chart of a text-to-speech synthesis method according to an embodiment of the present disclosure.

FIG. 1 is a flow chart of a text-to-speech synthesis method according to an embodiment of the present disclosure. In this embodiment, a computer-implemented text-to-speech synthesis method is provided. The text-to-speech synthesis method is applied to (a processor of) an electronic device (e.g., a mobile phone). In other embodiments, the method may be implemented through a text-to-speech synthesis apparatus shown in FIG. 6 or an electronic device shown in FIG. 8. As shown in FIG. 1, in this embodiment, the text-to-speech synthesis method may include the following steps.

S11: applying a (prosodic and intonation) phrase boundary detection to input text and dividing the input text into phrases based on results of the boundary detection.

In this embodiment, the input text is a text string input into the above-mentioned electronic device so as to perform speech synthesis. The linguistic studies show that the text contains features related to the prosodic pauses, which can be used for (prosodic and intonation) phrase boundary detection. In this embodiment, a prosodic pause prediction may be performed on the input text by using the pre-trained machine teaming models and the rule-based models (for example by exploiting the punctuations in the input text). In addition, after obtaining the prosodic pause characteristics of the input text, the divisional boundaries of the prosodic phrases may be determined in accordance with the position of the prosodic pause characteristics in the input text, so as to divide the input text into a plurality of prosodic phrases. As an example, the prosodic pause prediction model may be obtained by using deep learning neural network to train to the convergence state, which is capable of identifying the linguistic characteristics representing prosodic pauses.

S12: applying a streaming TTS (text-to-speech) to the divided phrases in sequence.

It can be no-waiting processing of a multi-thread, where the threads include the frontend analysis thread, the duration prediction thread, the acoustic prediction thread and the vocoding thread.

In this embodiment, a text-to-speech system needs to undergo the frontend analysis, the duration prediction, the acoustic prediction and the vocoding process. In the frontend analysis stage, it needs to perform the text normalization, phoneme prediction and prosody prediction; the duration prediction predicts the phoneme level duration; the acoustic prediction predicts the acoustic features; the vocoding predicts the speech audio based on the acoustic features. In addition, the text-to-speech synthesis system may be built with a multi-core and multi-threaded architecture to form a thread pool of thread queue connected by a plurality of data processing threads in series manner in the text-to-speech synthesis system. It can be understood that in the thread pool, the number of the data processing threads is determined by the number of processing steps of the process of text-to-speech synthesis, where one processing step corresponds to one data processing thread. The thread pool formed in the text-to-speech synthesis system may contain the text normalization processing thread, the phoneme prediction processing thread, the prosody prediction processing thread, and the speech synthesis processing thread. In the thread pool, the text normalization processing thread, the phoneme prediction processing thread, the prosody prediction processing thread, and the speech synthesis processing thread are connected in series to form a thread queue. The thread queue is used for performing the streamed speech synthesis processing on each of the prosodic phrases in the input text. Furthermore, the thread pool may process a plurality of different prosodic phrases at the same time based on the plurality of data processing threads, where one data processing thread only processes one prosodic phrase at a time. For example, after a thread processes a prosodic phrase and transmits the processed prosodic phrase to its next thread that is connected in series, it will then obtain the new unprocessed prosodic phrase for processing; and after the next thread receives the prosodic phrase processed by the previous thread, if the next thread currently does not have a prosodic phrase being processed, the received prosodic phrase will be processed immediately, and otherwise if the next thread currently has a prosodic phrase being processed, the received prosodic phrase will be processed after the next thread finishes the processing of the prosodic phrase being processed thereby realizing the asynchronous processing of the thread pool. Still furthermore, the streamed speech synthesis processing is performed on each of the prosodic phrases in the input text in the manner of asynchronous processing of the thread pool, so that the prosodic phrase to be processed by the text normalization processing, the phoneme prediction processing, the prosody prediction processing, and the speech synthesis process in turn, and finally the short sentence audio is synthesized according to the prosodic phrases, while the next prosodic phrase in the input text that is located behind the previous prosodic phrase immediately enters the first processing step for processing after the previous prosodic phrase completes the processing of the first processing step, thereby realizing that the processing process of the previous prosodic phrase in the second processing step does not affect that of the next prosodic phrase in the first processing step, which greatly saves the processing time during the speech synthesis of the input text to the audio playback. Consequently, the speech synthesis is speeded up, the first packet delay of text-to-speech synthesis is shorten, so that the text-to-speech synthesis system can start to play the synthesized audio continuously after a few time consumption.

S13: conducting the streaming TTS to the divided phrases in sequence, and starting an audio playback when a first packet of a speech corresponding to the first divided phrase is done.

In this embodiment, the text-to-speech synthesis system synthesizes the short sentence audios in accordance with the prosodic phrases. When the short sentence audio corresponding to the first prosodic phrase in the input text is synthesized, the audio playback operation of the input text is performed according to the short sentence audios corresponding to the first prosodic phrase until all the short sentence audios corresponding to all the prosodic phrases are synthesized and the playback of the short sentence audio corresponding to the last prosodic phrase is completed. As an example, in this embodiment, when the text-to-speech synthesis system synthesizes the short sentence audio corresponding to the first prosodic phrase in the input text, the audio playback operation of the input text is started to perform according to the short sentence audio, and the playback of the short sentence audio is started; and when the short sentence audio corresponding to the second prosodic phrase is synthesized and the playback of the short sentence audio corresponding to the first prosodic phrase is finished, the short sentence audio corresponding to the second prosodic phrase is played, thereby realizing a streamed process that synthesizing and playing audio simultaneously. In which, the streaming refers to that audios are played and synthesized simultaneously based on a multi-core and multi-threaded architecture.

As can be seen that in this embodiment, the text-to-speech processing method is provided. By adopting thread pool asynchronous processing, the prosodic phrases are obtained from the input text based on the boundary prediction results, and the streamed speech synthesis processing is performed on the input text with the prosodic phrase as a stand-alone unit, thereby synthesizing the short sentence audios in accordance with the prosodic phrases. In addition, when synthesizing the short sentence audio corresponding to the first prosodic phrase in the input text, the audio playback operation of the input text is started to perform in accordance with the short sentence audio, thereby realizing simultaneous processing of a plurality of different prosodic phrases through parallel operation of a plurality of threads, so that the processing time can be saved greatly, the speech synthesis can be speeded up, and the first packet delay of the text-to-speech synthesis can be shorten, which makes the text-to-speech synthesis system to be capable of starting to play the synthesized audios continuously after a shorter time consumption. Furthermore, since the sentences are divided at wherever the rhythm stops, the transition between the short sentences will not affect the hearing experience of the user, and the loss of the quality of the synthesized audio will be small.

Figure 2:
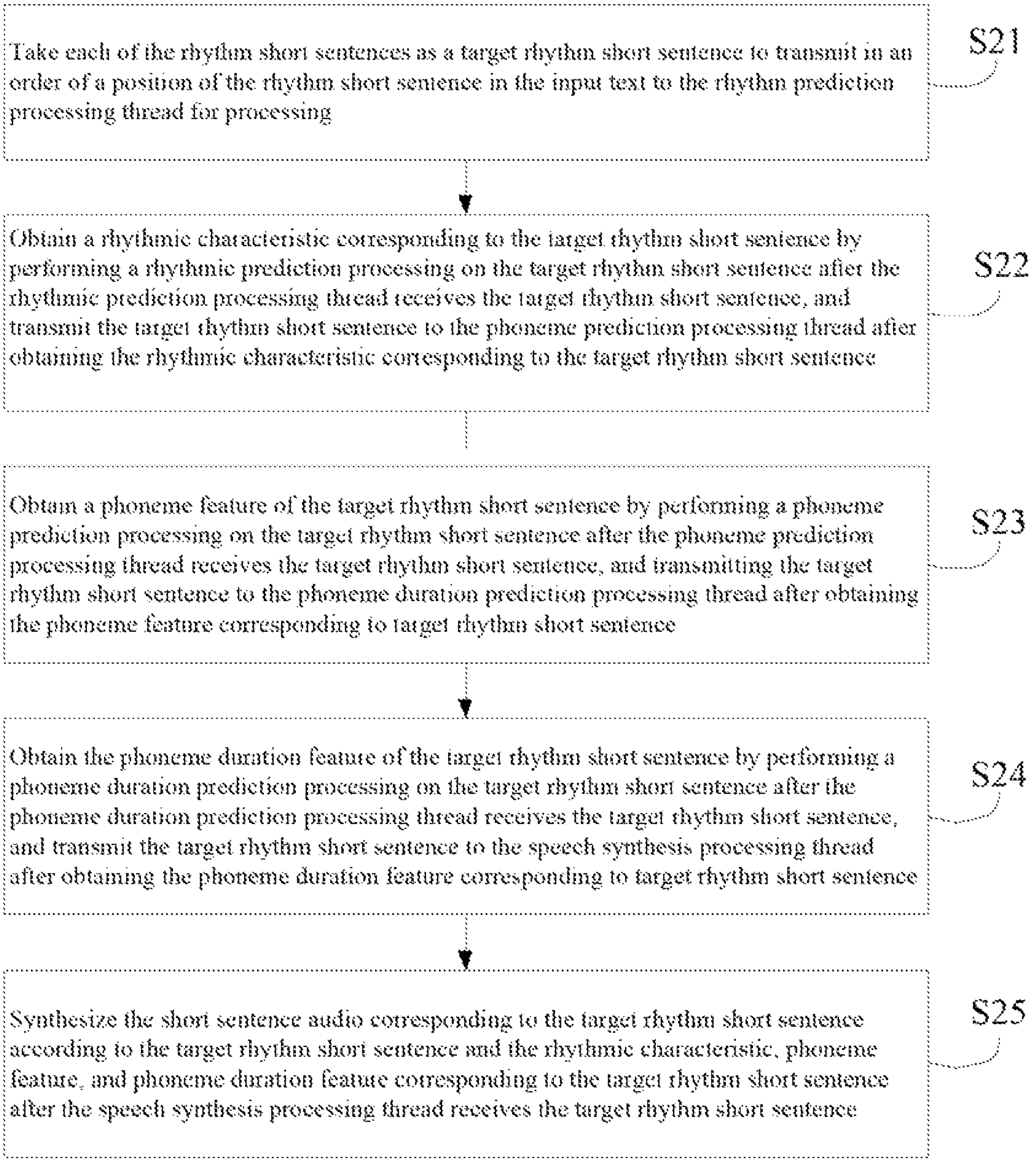
FIG. 2 is a flow chart of an example of synthetizing short sentence audios in the text-to-speech synthesis method of FIG. 1.

FIG. 2 is a flow chart of an example of synthetizing short sentence audios in the text-to-speech synthesis method of FIG. 1. As shown in FIG. 2, in some embodiments, the synthetizing of the short sentence audios in the text in the text-to-speech synthesis method may include the following steps.

S21: taking each of the prosodic phrases as a target prosodic phrase to transmit in an order of a position of the prosodic phrase in the input text to the rhythm prediction processing thread for processing;

S22: obtaining a prosody characteristic corresponding to the target prosodic phrase by performing a word-level prosody prediction processing on the target prosodic phrase after the prosody prediction processing thread receives the target prosodic phrase, and transmitting the target prosodic phrase to the phoneme prediction processing thread after obtaining the prosody characteristic corresponding to the target prosodic phrase;

S23: obtaining phoneme prediction results from the target prosodic phrase by performing a phoneme prediction processing on the target prosodic phrase after the phoneme prediction processing thread receives the target prosodic phrase, and transmitting the target prosodic phrase to the phoneme duration prediction processing thread after obtaining the phoneme prediction results corresponding to target prosodic phrase;

S24: applying a duration prediction and an acoustic prediction to the target prosodic phrase based on a frontend analysis result, and inputting the frontend analysis result to a vocoder.

S25: synthesizing, through the vocoder, the short sentence audio corresponding to the target prosodic phrase according to the target prosodic phrase and the prosody characteristic, phoneme prediction results, and phoneme duration feature corresponding to the target prosodic phrase after the speech synthesis processing thread receives the target prosodic phrase.

Figure 3:
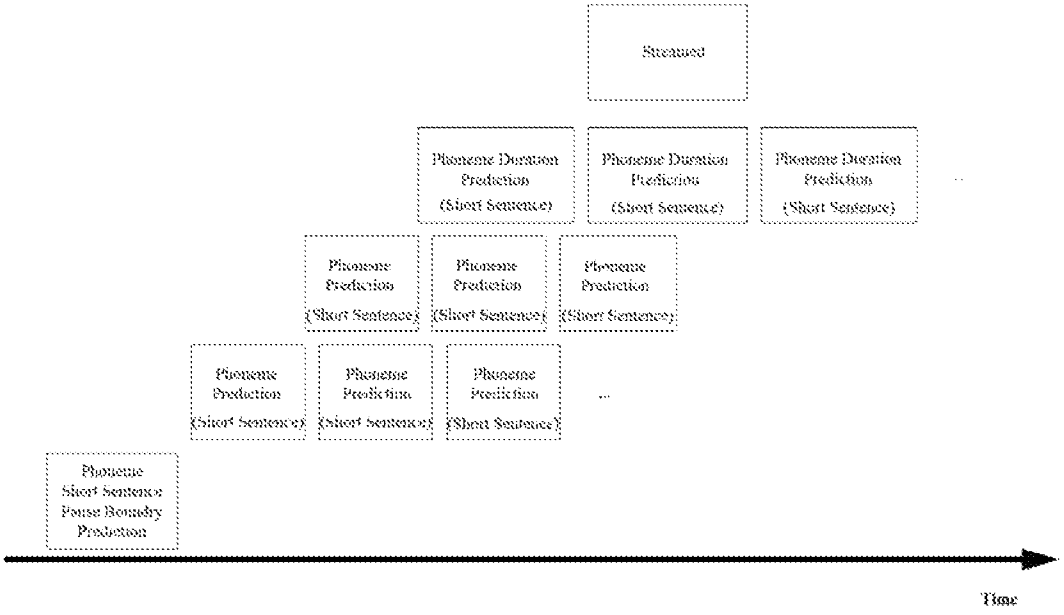
FIG. 3 is a schematic diagram of a process of processing prosodic phrases through thread pool asynchronous processing in the text-to-speech synthesis method of FIG. 1

In this embodiment, the order in which each data processing thread in the thread pool is connected as the queue is: the word-level prosody prediction processing thread, the phoneme prediction processing thread, the phoneme duration prediction processing thread, the acoustic prediction thread and the vocoding thread. FIG. 3 is a schematic diagram of a process of processing prosodic phrases through thread pool asynchronous processing in the text-to-speech synthesis method of FIG. 1. As shown in FIG. 3, in this embodiment, after the input text is divided into prosodic phrases, each of the prosodic phrases may be taken as a target prosodic phrase to transmit in an order of a position of the prosodic phrase in the input text to the rhythm prediction processing thread for processing. In addition, when each prosodic phrase is transmitted to the rhythm prediction processing thread, after the division of the prosodic phrase of the input text is completed, the first one of the prosodic phrase in the input text may be transmitted to the rhythm prediction processing thread in active manner, and the second one and later of the prosodic phrases in the input text may be transmitted in accordance with an obtaining instruction issued by the prosody prediction processing thread. The prosody prediction processing thread performs the prosody prediction processing on the first target prosodic phrase after receiving the first target prosodic phrase so as to obtain the prosody characteristics corresponding to the first target prosodic phrase, and transmits the first target prosodic phrase to the next stage of speech synthesis that is performed by the phoneme prediction processing thread for processing after obtaining the prosody characteristics corresponding to the first target prosodic phrase. Furthermore, the phoneme prediction processing thread receives the first target prosodic phrase to perform phoneme prediction processing so as to obtain the phoneme prediction results of the first target prosodic phrase, and transmits the first target prosodic phrase to the next stage of speech synthesis that is performed by the phoneme duration prediction processing thread after obtaining the phoneme prediction results corresponding to the first target prosodic phrase. Still furthermore, after the prosody prediction processing thread transmits the first target prosodic phrase to the phoneme prediction processing thread, the prosody prediction processing thread may issue an indication of obtaining the next target prosodic phrase to obtain the second one of the prosodic phrases in the input text so as to take as the new target prosodic phrase for the prosody prediction processing thread to perform prosody prediction processing, thereby achieving that the phoneme prediction processing thread performs phoneme prediction processing on the first target prosodic phrase while the prosody prediction processing thread also performs prosody prediction processing on the second prosodic phrase.

By presuming the TTS results of the prosodic phrases are independent, the phrase-level streaming TTS processes can be asynchronous and done in a pipeline manner. Specifically, for each frontend analysis, duration prediction, TTS process for In this embodiment, the phoneme duration prediction processing thread performs phoneme duration prediction processing on the first target prosodic phrase after receiving the first target prosodic phrase so as to obtain the phoneme characteristics of the target prosodic phrase, and transmits the first target prosodic phrase to the speech synthesis processing thread after obtaining the phoneme duration characteristics corresponding to the first target prosodic phrase. After the phoneme duration prediction processing thread receives the first target prosodic phrase, if the second target prosodic phrase has processed by the rhythm prediction processing thread to transmit to the phoneme prediction processing thread, then at this time, the prosody prediction thread will obtain the third one of the prosodic phrases in the input text to take as the new target prosodic phrase for prosody prediction processing, while the phoneme prediction processing thread performs phoneme prediction processing on the second target prosodic phrase and the phoneme duration prediction processing thread performs phoneme duration prediction processing on the first target prosodic phrase, thereby realizing that the three threads of the text normalization thread, the phoneme prediction processing thread, and the prosody prediction processing thread to processes three different prosodic phrases in asynchronous manner. In addition, after receiving the first target prosodic phrase, the speech synthesis processing thread synthesizes the short sentence audio corresponding to the first target prosodic phrase based on the first target prosodic phrase and the prosody characteristics, the phoneme characteristics, and the phoneme duration characteristics corresponding to the first target prosodic phrase that are obtained by the text normalization processing thread, the phoneme prediction processing thread, and the prosody prediction processing thread, respectively. Furthermore, when the speech synthesis processing thread synthesizes the short sentence audio corresponding to the first target prosodic phrase, the prosodic phrase may be taken as a stand-alone unit so as to realize that each data processing thread in the thread pool has a corresponding prosodic phrase to process in accordance with the principle of first in first out. In comparison with the prosodic phrases processed by the data processing thread at the rear of the queue, the prosodic phrases processed by the data processing thread at the front of the queue is at the rear of the input text. As an example, when the speech synthesis processing threads synthesizes the short sentence audio corresponding to the first target prosodic phrase, at the same time, the prosody prediction processing thread is processing the short sentence of the fourth position in the input text, the phoneme prediction processing thread is processing the short sentence of the third position in the input text, and the phoneme duration prediction processing thread is processing the short sentence of the second position in the input text, thereby realizing simultaneous processing of a plurality of different prosodic phrases through a plurality of data processing threads, so that the processing time can be saved greatly, the speech synthesis can be speeded up, and the first packet delay of the text-to-speech synthesis can be shorten, which makes the text-to-speech synthesis system to be capable of starting to play the synthesized audios continuously after a shorter time consumption.

Figure 4:
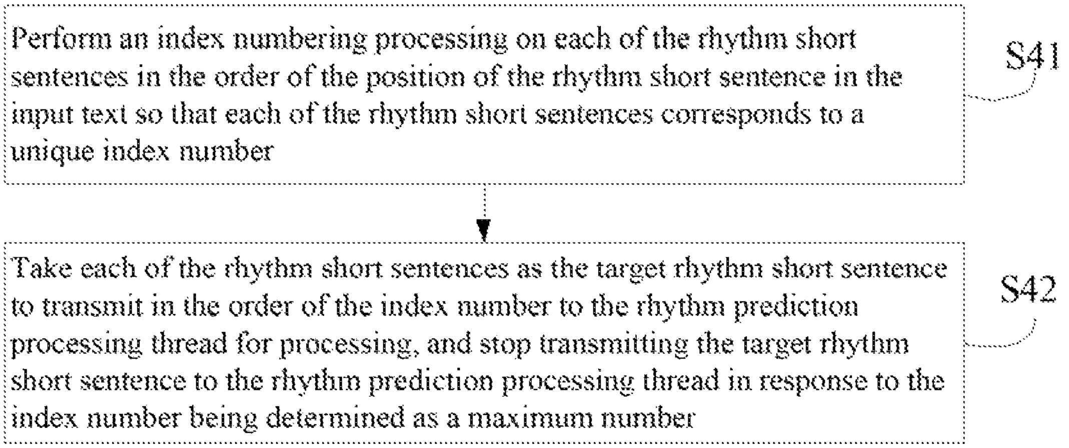
FIG. 4 is a flow chart of an example of transmitting the target prosodic phrase to the prosody prediction processing thread in the text-to-speech synthesis method of FIG. 1.

FIG. 4 presents the stop criteria of the process, which is when the TTS processes for all the phrases are done. It is a flow chart of an example of transmitting the target prosodic phrase to the prosody prediction processing thread in the text-to-speech synthesis method of FIG. 1. In some embodiments, as shown in FIG. 4, in the text-to-speech synthesis method, the transmission of the target prosodic phrase to the prosody prediction processing thread may include the following steps.

S41: performing an index numbering processing on each of the prosodic phrases in the order of the position of the prosodic phrase in the input text so that each of the prosodic phrases corresponds to a unique index number;

S42: taking each of the prosodic phrases as the target prosodic phrase to transmit in the order of the index number to the rhythm prediction processing thread for processing, and stopping transmitting the target prosodic phrase to the rhythm prediction processing thread in response to the index number being determined as a maximum number.

In this embodiment, after the input text is divided to obtain a plurality of prosodic phrases, index numbering may be performed on each prosodic phrase in the input text according to the position sequence of the prosodic phrase in the input text. For example, the index number of the prosodic phrase positioned at the first position in the input text is set as 1, the index number of the prosodic phrase positioned at the second position in the input text is set as 2, the index number of the prosodic phrase positioned at the third position in the input text is set as 3, and the like. If the input text has n prosodic phrases totally, each prosodic phrase may be indexed as 1-n respectively. After obtaining the index number corresponding to each prosodic phrase, the prosodic phrase may be taken as the target prosodic phrase to transmit to the prosody prediction processing thread according to the index number for processing. In this embodiment, after each transmission of a target prosodic phrase to the prosody prediction processing thread for processing, the index number of the currently processed target prosodic phrase may be compared with a maximum number so as to determine whether the index number of the last prosodic phrase having processed by the prosody prediction processing thread processed is the maximum number. If yes, it represents that the text-to-speech operation on the input text has reached the last sentence, at this time, it can stop the transmission of the target prosodic phrase to the target prediction processing thread.

It should be understood that, the sequence of the serial number of the steps in the above-mentioned embodiments does not mean the execution order while the execution order of each process should be determined by its function and internal logic, which should not be taken as any limitation to the implementation process of the embodiments.

Figure 5:
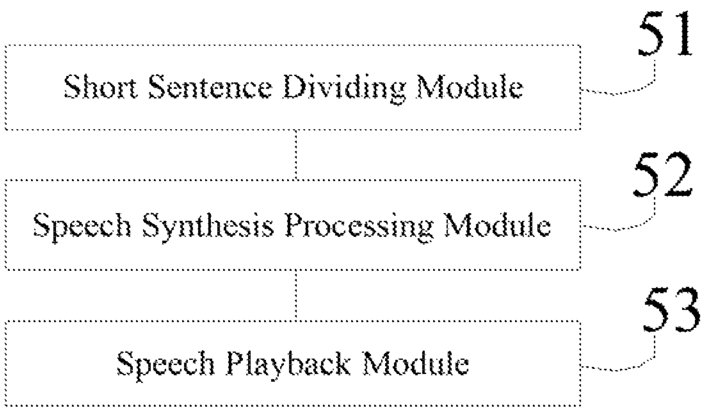
FIG. 5 is a schematic block diagram of the basic structure of a text-to-speech synthesis apparatus according to an embodiment of the present disclosure.

FIG. 5 is a schematic block diagram of the basic structure of a text-to-speech synthesis apparatus according to an embodiment of the present disclosure. In some embodiments, as shown in FIG. 5, the basic structure of a text-to-speech synthesis apparatus is provided. Each unit included in the apparatus is used to perform each step in the above-mentioned method embodiment. Please refer to the related description in the above-mentioned method embodiments. For convenience of explanation, only the parts related to this embodiment is shown. The text-to-speech synthesis apparatus may include a short sentence dividing module 51, a speech synthesis processing module 52, and a speech playback module 53. In which, the short sentence dividing module 51 is configured to obtain prosodic pause features of an input text by performing a prosodic pause prediction processing on the input text, and divide the input text into a plurality of prosodic phrases according to the prosodic pause features; the speech synthesis processing module 52 is configured to synthesize short sentence audios according to the prosodic phrases by performing a streamed speech synthesis processing on each of the prosodic phrases in the input text in a manner of asynchronous processing of a thread pool, where the thread pool includes a text normalization processing thread, a phoneme prediction processing thread, a prosody prediction processing thread, and a speech synthesis processing thread; and the speech playback module 53 is configured to perform an audio playback operation of the input text according to the short sentence audios corresponding to the first prosodic phrase of the input text, in response to synthesizing the short sentence audio corresponding to the first prosodic phrase of the input text.

Figure 6:
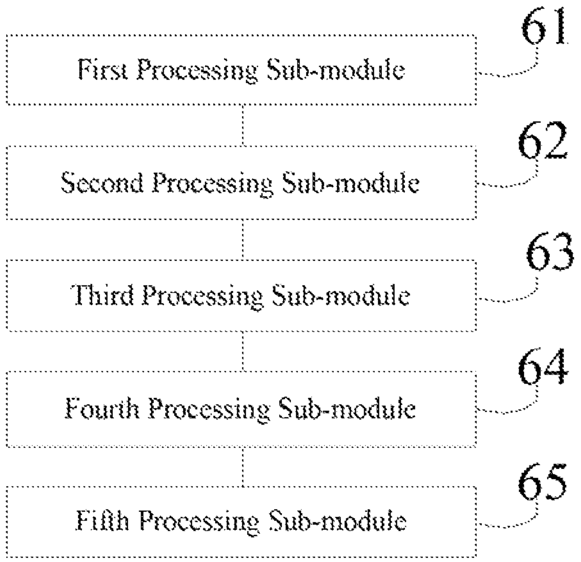
FIG. 6 is a schematic block diagram of the first refinement structure of the text-to-speech processing apparatus of FIG. 5.

FIG. 6 is a schematic block diagram of the first refinement structure of the text-to-speech processing apparatus of FIG. 5. In some embodiments, as shown in FIG. 6, the first refinement structure of the text-to-speech processing apparatus of FIG. 5 is provided. The text-to-speech processing apparatus may further include a first processing sub-module 61, a second processing sub-module 62, a third processing sub-module 63, a fourth processing sub-module 64, and a fifth processing sub-module 65. The first processing sub-module 61 is configured to take each of the prosodic phrases as a target prosodic phrase to transmit in an order of a position of the prosodic phrase in the input text to the rhythm prediction processing thread for processing. The second processing sub-module 62 is configured to obtain a prosody characteristic corresponding to the target prosodic phrase by performing a prosody prediction processing on the target prosodic phrase after the prosody prediction processing thread receives the target prosodic phrase, and transmit the target prosodic phrase to the phoneme prediction processing thread after obtaining the prosody characteristic corresponding to the target prosodic phrase. The third processing sub-module 63 is configured to obtain a phoneme feature of the target prosodic phrase by performing a phoneme prediction processing on the target prosodic phrase after the phoneme prediction processing thread receives the target prosodic phrase, and transmit the target prosodic phrase to the phoneme duration prediction processing thread after obtaining the phoneme feature corresponding to target prosodic phrase. The fourth processing sub-module 64 is configured to obtain the phoneme duration feature of the target prosodic phrase by performing a phoneme duration prediction processing on the target prosodic phrase after the phoneme duration prediction processing thread receives the target prosodic phrase, and transmit the target prosodic phrase to the speech synthesis processing thread after obtaining the phoneme duration feature corresponding to target prosodic phrase. The fifth processing sub-module 65 is configured to synthesize the short sentence audio corresponding to the target prosodic phrase according to the target prosodic phrase and the prosody characteristic, phoneme feature, and phoneme duration feature corresponding to the target prosodic phrase after the speech synthesis processing thread receives the target prosodic phrase.

Figure 7:
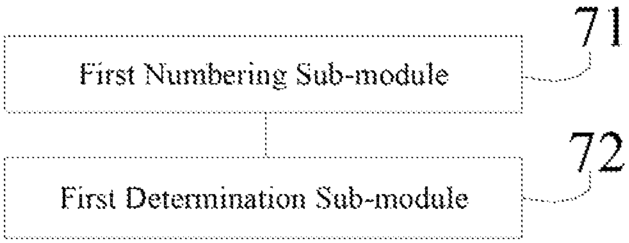
FIG. 7 is a schematic block diagram of the second refinement structure of the text-to-speech processing apparatus of FIG. 5.

FIG. 7 is a schematic block diagram of the second refinement structure of the text-to-speech processing apparatus of FIG. 5. In some embodiments, as shown in FIG. 7, the second refinement structure of the text-to-speech processing apparatus of FIG. 5 is provided. In which, the text-to-speech processing apparatus further includes a first numbering sub-module 71 and a first determination sub-module 72. The first numbering sub-module 71 is configured to perform an index numbering processing on each of the prosodic phrases in the order of the position of the prosodic phrase in the input text so that each of the prosodic phrases corresponds to a unique index number; and the first determination sub-module 72 is configured to take each of the prosodic phrases as the target prosodic phrase to transmit in the order of the index number to the rhythm prediction processing thread for processing, and stop transmitting the target prosodic phrase to the rhythm prediction processing thread in response to the index number being determined as a maximum number.

In some embodiments, the text-to-speech processing apparatus may further include a thread series connecting sub-module. The thread series connecting sub-module is configured to obtain a thread queue for performing the streamed speech synthesis processing on each of the prosodic phrases in the input text by connecting the text normalization processing thread, the phoneme prediction processing thread, the prosody prediction processing thread, and the speech synthesis processing thread in the thread pool in a sequential manner.

Figure 8:
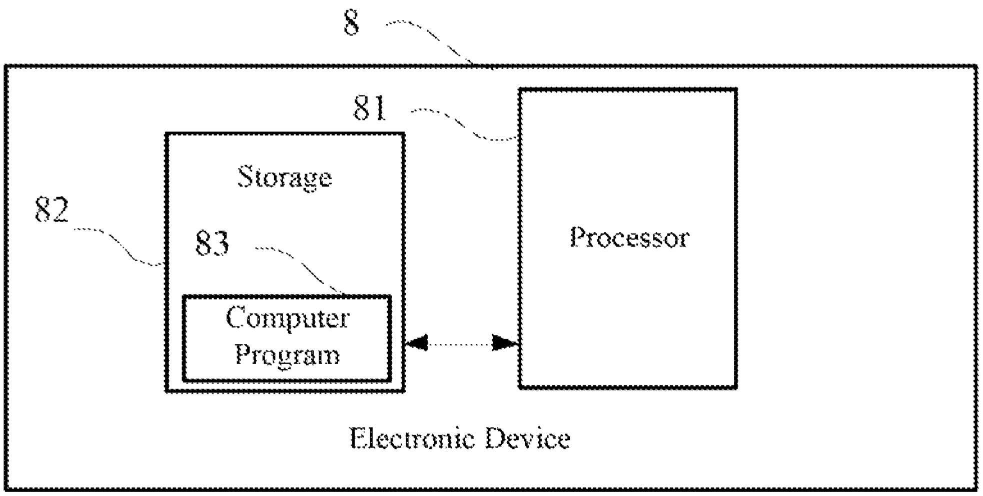
FIG. 8 is a schematic block diagram of the basic structure of an electronic device according to an embodiment of the present disclosure.

FIG. 8 is a schematic block diagram of the basic structure of an electronic device according to an embodiment of the present disclosure. In some embodiments, as shown in FIG. 8, the basic structure of an electronic device 8 is provided. The electronic device 8 may include a processor 81, a storage 82, and a computer program 83 stored in the storage 82 and executable on the processor 81, for example, a program of the text-to-speech synthesis method. When executing (instructions in) the computer program 83, the processor 81 implements the steps in the above-mentioned embodiments of the text-to-speech synthesis method. Alternatively, when the processor 81 executes the (instructions in) computer program 83, the functions of each module in the embodiments corresponding to the above-mentioned text-to-speech synthesis apparatus. The details please refer to the related description in the embodiments, which will that be repeated herein.

Exemplarily, the computer program 83 may be divided into one or more modules (units), and the one or more modules are stored in the storage 82 and executed by the processor 81 to realize the present disclosure. The one or more modules may be a series of computer program instruction sections capable of performing a specific function, and the instruction sections are for describing the execution process of the computer program 83 in the electronic device 8. For example, the computer program 83 can be divided into a short sentence dividing module, a speech synthesis processing module, and a speech playback module 53. The function of each module is as above.

The electronic device 8 may include, but is not limited to, the processor 81 and the storage 82. It can be understood by those skilled in the art that FIG. 8 is merely an example of the electronic device 8 and does not constitute a limitation on the electronic device 8, and may include more or fewer components than those shown in the figure, or a combination of some components or different components. For example, the electronic device 8 may further include an input/output device, a network access device, a bus, and the like.

The processor 81 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 82 may be an internal storage unit of the electronic device 8, for example, a hard disk or a memory of the electronic device 8. The storage 82 may also be an external storage device of the electronic device 8, for example, a plug-in hard disk, a smart media card (SMC), a secure digital (SD) card, flash card, and the like, which is equipped on the electronic device 8. Furthermore, the storage 82 may further include both an internal storage unit and an external storage device, of the electronic device 8. The storage 82 is configured to store the computer program 83 and other programs and data required by the electronic device 8. The storage 82 may also be used to temporarily store data that has been or will be output.

It should be noted that, the information exchange, execution process and other contents between the above-mentioned device/units are based on the same concept as the method embodiments of the present disclosure. For the specific functions and technical effects, please refer to the method embodiments, which will not be repeated herein.

The embodiments of the present disclosure further provide a computer-readable storage medium storing computer program(s), and the steps in each of the above-mentioned method embodiments is implemented when the computer program(s) are executed by the processor. In this embodiment, the computer-readable storage medium may be non-volatile.

The embodiments of the present disclosure further provide a computer program product. When the computer program product is executed on the electronic device, the steps in each of the above-mentioned method embodiments is implemented.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

When the integrated module/unit is implemented in the form of a software functional unit and is sold or used as an independent product, the integrated module/unit may be stored in a non-transitory computer readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer readable storage medium, which may implement the steps of each of the above-mentioned method embodiments when executed by a processor. In which, the computer program includes computer program codes which may be the form of source codes, object codes, executable files, certain intermediate, and the like. The computer readable medium may include any entity or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

In the above-mentioned embodiments, the description of each embodiment has its focuses, and the parts which are not described or mentioned in one embodiment may refer to the related descriptions in other embodiments.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented text-to-speech synthesis method for an electronic device comprising a processor and a speaker electrically coupled to the processor, wherein the method comprises:

performing, by the processor using pre-trained machine learning models and rule-based models, a prosodic pause prediction processing on an input text inputted into the electronic device to obtain prosodic pause features of the input text, and dividing the input text into a plurality of prosodic phrases according to the prosodic pause features, wherein the pre-trained machine learning models are configured for identifying linguistic characteristics representing prosodic pauses, and are obtained by using a deep learning neural network to train to a convergence state;

synthesizing, by the processor, short sentence audios according to the prosodic phrases by performing a streamed speech synthesis processing on each of the prosodic phrases in the input text in a manner of asynchronous processing of a thread pool, wherein the thread pool comprises: a prosody prediction processing thread, a phoneme prediction processing thread, a phoneme duration prediction processing thread, and a speech synthesis processing thread, wherein each of the prosodic phrases is processed sequentially by the prosody prediction processing thread, the phoneme prediction processing thread, the phoneme duration prediction processing thread and the speech synthesis processing thread. and wherein the prosody prediction processing thread is for obtaining prosody characteristics corresponding to each of the prosodic phrases, the phoneme prediction processing thread is for obtaining phoneme features of each of the prosodic phrases, and the phoneme duration prediction processing thread is for obtaining phoneme duration features of each of the prosodic phrases; and controlling, by the processor, the speaker to perform an audio playback operation of the input text according to the short sentence audios corresponding to the first prosodic phrase of the input text, in response to synthesizing the short sentence audio corresponding to the first prosodic phrase of the input text.

2. The method of claim 1, wherein the synthesizing the short sentence audios according to the prosodic phrases by performing the streamed speech synthesis processing on each of the prosodic phrases in the input text in the manner of asynchronous processing of the thread pool comprises:

taking each of the prosodic phrases as a target prosodic phrase to transmit in an order of a position of the prosodic phrase in the input text to the prosody prediction processing thread for processing;

obtaining a prosody characteristic corresponding to the target prosodic phrase by performing a prosody prediction processing on the target prosodic phrase after the prosody prediction processing thread receives the target prosodic phrase, and transmitting the target prosodic phrase to the phoneme prediction processing thread after obtaining the prosody characteristic corresponding to the target prosodic phrase;

obtaining a phoneme feature of the target prosodic phrase by performing a phoneme prediction processing on the target prosodic phrase after the phoneme prediction processing thread receives the target prosodic phrase, and transmitting the target prosodic phrase to the phoneme duration prediction processing thread after obtaining the phoneme feature corresponding to target prosodic phrase;

obtaining the phoneme duration feature of the target prosodic phrase by performing a phoneme duration prediction processing on the target prosodic phrase after the phoneme duration prediction processing thread receives the target prosodic phrase, and transmitting the target prosodic phrase to the speech synthesis processing thread after obtaining the phoneme duration feature corresponding to target prosodic phrase; and synthesizing the short sentence audio corresponding to the target prosodic phrase according to the target prosodic phrase and the prosody characteristic, phoneme feature, and phoneme duration feature corresponding to the target prosodic phrase after the speech synthesis processing thread receives the target prosodic phrase.

3. The method of claim 2, wherein the taking each of the prosodic phrases as the target prosodic phrase to transmit in the order of the position of the prosodic phrase in the input text to the prosody prediction processing thread for processing comprises:

performing an index numbering processing on each of the prosodic phrases in the order of the position of the prosodic phrase in the input text so that each of the prosodic phrases corresponds to a unique index number; and taking each of the prosodic phrases as the target prosodic phrase to transmit in the order of the index number to the prosody prediction processing thread for processing, and stopping transmitting the target prosodic phrase to the prosody prediction processing thread in response to the index number being determined as a maximum number.

4. The method of claim 1, wherein the synthesizing the short sentence audios according to the prosodic phrases by performing the streamed speech synthesis processing on each of the prosodic phrases in the input text in the manner of asynchronous processing of the thread pool further comprises:

obtaining a thread queue for performing the streamed speech synthesis processing on each of the prosodic phrases in the input text by connecting the prosody prediction processing thread, the phoneme prediction processing thread, the phoneme duration prediction processing thread, and the speech synthesis processing thread in the thread pool in a sequential manner.

5. The method of claim 1, wherein the rule-based models are by exploiting punctuations in the input text.

6. The method of claim 1, wherein the linguistic characteristics representing the prosodic pauses are used for phrase boundary detection, and the phrase boundary detection comprises detection of prosodic and intonation.

7. The method of claim 1, wherein, after obtaining the prosodic pause features of the input text, the processor determines divisional boundaries of the prosodic phrases according to positions of the prosodic pause features in the input text, and divides the input text into the plurality of prosodic phrases according to the divisional boundaries of the prosodic phrases.

8. The method of claim 1, wherein the short sentence audios are synthesized in accordance with the prosodic phrases, and when the short sentence audio corresponding to the first prosodic phrase in the input text is synthesized, the audio playback operation of the input text is performed according to the short sentence audios corresponding to the first prosodic phrase, until all the short sentence audios corresponding to all the prosodic phrases are synthesized and the playback of the short sentence audio corresponding to the last prosodic phrase is completed.

9. The method of claim 1, wherein, after the input text is divided into the plurality of prosodic phrases, the processor transmits the first prosodic phrase in the input text to the prosody prediction processing thread in active manner, and transmits other prosodic phrases in the input text in response to obtaining instructions sent by the prosody prediction processing thread; and wherein, after the prosody prediction processing thread transmits the first prosodic phrase to the phoneme prediction processing thread, the prosody prediction processing thread sends an obtaining instruction for obtaining a next prosodic phrase in the input text.

10. The method of claim 1, wherein the input text is a text string input into the electronic device.

11. The method of claim 1, wherein one data processing thread in the thread pool only processes one prosodic phrase at a time.

12. The method of claim 11, wherein a number of data processing threads in the thread pool is determined by a number of processing steps of a process of text-to-speech synthesis, and wherein one processing step corresponds to one data processing thread.

13. An electronic device, comprising:

a processor;

a speaker coupled to the processor;

a memory coupled to the processor; and one or more computer programs stored in the memory and executable on the processor;

wherein, the one or more computer programs comprise:

instructions for performing, by using pre-trained machine learning models and rule-based models, a prosodic pause prediction processing on an input text inputted into the electronic device to obtain prosodic pause features of the input text, and dividing the input text into a plurality of prosodic phrases according to the prosodic pause features, wherein the pre-trained machine learning models are configured for identifying linguistic characteristics representing prosodic pauses, and are obtained by using a deep learning neural network to train to a convergence state;

instructions for synthesizing short sentence audios according to the prosodic phrases by performing a streamed speech synthesis processing on each of the prosodic phrases in the input text in a manner of asynchronous processing of a thread pool, wherein the thread pool comprises: a prosody prediction processing thread, a phoneme prediction processing thread, a phoneme duration prediction processing thread, and a speech synthesis processing thread, wherein each of the prosodic phrases is processed sequentially by the prosody prediction processing thread, the phoneme prediction processing thread. the phoneme duration prediction processing thread and the speech synthesis processing thread, and wherein the prosody prediction processing thread is for obtaining prosody characteristics corresponding to each of the prosodic phrases. the phoneme prediction processing thread is for obtaining phoneme features of each of the prosodic phrases, and the phoneme duration prediction processing thread is for obtaining phoneme duration features of each of the prosodic phrase; and instructions for controlling the speaker to perform an audio playback operation of the input text according to the short sentence audios corresponding to the first prosodic phrase of the input text, in response to synthesizing the short sentence audio corresponding to the first prosodic phrase of the input text.

14. The electronic device of claim 13, wherein the synthesizing the short sentence audios according to the prosodic phrases by performing the streamed speech synthesis processing on each of the prosodic phrases in the input text in the manner of asynchronous processing of the thread pool comprises:

taking each of the prosodic phrases as a target prosodic phrase to transmit in an order of a position of the prosodic phrase in the input text to the prosody prediction processing thread for processing;

obtaining a prosody characteristic corresponding to the target prosodic phrase by performing a prosody prediction processing on the target prosodic phrase after the prosody prediction processing thread receives the target prosodic phrase, and transmitting the target prosodic phrase to the phoneme prediction processing thread after obtaining the prosody characteristic corresponding to the target prosodic phrase;

obtaining a phoneme feature of the target prosodic phrase by performing a phoneme prediction processing on the target prosodic phrase after the phoneme prediction processing thread receives the target prosodic phrase, and transmitting the target prosodic phrase to the phoneme duration prediction processing thread after obtaining the phoneme feature corresponding to target prosodic phrase;

obtaining the phoneme duration feature of the target prosodic phrase by performing a phoneme duration prediction processing on the target prosodic phrase after the phoneme duration prediction processing thread receives the target prosodic phrase, and transmitting the target prosodic phrase to the speech synthesis processing thread after obtaining the phoneme duration feature corresponding to target prosodic phrase; and synthesizing the short sentence audio corresponding to the target prosodic phrase according to the target prosodic phrase and the prosody characteristic, phoneme feature, and phoneme duration feature corresponding to the target prosodic phrase after the speech synthesis processing thread receives the target prosodic phrase.

15. The electronic device of claim 14, wherein the taking each of the prosodic phrases as the target prosodic phrase to transmit in the order of the position of the prosodic phrase in the input text to the prosody prediction processing thread for processing comprises:

performing an index numbering processing on each of the prosodic phrases in the order of the position of the prosodic phrase in the input text so that each of the prosodic phrases corresponds to a unique index number; and taking each of the prosodic phrases as the target prosodic phrase to transmit in the order of the index number to the prosody prediction processing thread for processing, and stopping transmitting the target prosodic phrase to the prosody prediction processing thread in response to the index number being determined as a maximum number.

16. The electronic device of claim 13, wherein the synthesizing the short sentence audios according to the prosodic phrases by performing the streamed speech synthesis processing on each of the prosodic phrases in the input text in the manner of asynchronous processing of the thread pool further comprises:

obtaining a thread queue for performing the streamed speech synthesis processing on each of the prosodic phrases in the input text by connecting the prosody prediction processing thread, the phoneme prediction processing thread, the phoneme duration prediction processing thread, and the speech synthesis processing thread in the thread pool in a sequential manner.

17. A non-transitory computer-readable storage medium for storing one or more computer programs executable on a processor, wherein the one or more computer programs comprise:

instructions for performing, by using pre-trained machine learning models and rule-based models, a prosodic pause prediction processing on an input text inputted into an electronic device to obtain prosodic pause features of the input text, and dividing the input text into a plurality of prosodic phrases according to the prosodic pause features, wherein the pre-trained machine learning models are configured for identifying linguistic characteristics representing prosodic pauses, and are obtained by using a deep learning neural network to train to a convergence state;

instructions for synthesizing short sentence audios according to the prosodic phrases by performing a streamed speech synthesis processing on each of the prosodic phrases in the input text in a manner of asynchronous processing of a thread pool, wherein the thread pool comprises: a prosody prediction processing thread, a phoneme prediction processing thread, a phoneme duration prediction processing thread, and a speech synthesis processing thread, wherein each of the prosodic phrases is processed sequentially by the prosody prediction processing thread, the phoneme prediction processing thread, the phoneme duration prediction processing thread and the speech synthesis processing thread, and wherein the prosody prediction processing thread is for obtaining prosody characteristics corresponding to each of the prosodic phrases, the phoneme prediction processing thread is for obtaining phoneme features of each of the prosodic phrases, and the phoneme duration prediction processing thread is for obtaining phoneme duration features of each of the prosodic phrase; and instructions for controlling a speaker of the electronic device to perform an audio playback operation of the input text according to the short sentence audios corresponding to the first prosodic phrase of the input text, in response to synthesizing the short sentence audio corresponding to the first prosodic phrase of the input text.

18. The storage medium of claim 17, wherein the synthesizing the short sentence audios according to the prosodic phrases by performing the streamed speech synthesis processing on each of the prosodic phrases in the input text in the manner of asynchronous processing of the thread pool comprises:

taking each of the prosodic phrases as a target prosodic phrase to transmit in an order of a position of the prosodic phrase in the input text to the prosody prediction processing thread for processing;

obtaining a prosody characteristic corresponding to the target prosodic phrase by performing a prosody prediction processing on the target prosodic phrase after the prosody prediction processing thread receives the target prosodic phrase, and transmitting the target prosodic phrase to the phoneme prediction processing thread after obtaining the prosody characteristic corresponding to the target prosodic phrase;

obtaining a phoneme feature of the target prosodic phrase by performing a phoneme prediction processing on the target prosodic phrase after the phoneme prediction processing thread receives the target prosodic phrase, and transmitting the target prosodic phrase to the phoneme duration prediction processing thread after obtaining the phoneme feature corresponding to target prosodic phrase;

obtaining the phoneme duration feature of the target prosodic phrase by performing a phoneme duration prediction processing on the target prosodic phrase after the phoneme duration prediction processing thread receives the target prosodic phrase, and transmitting the target prosodic phrase to the speech synthesis processing thread after obtaining the phoneme duration feature corresponding to target prosodic phrase; and synthesizing the short sentence audio corresponding to the target prosodic phrase according to the target prosodic phrase and the prosody characteristic, phoneme feature, and phoneme duration feature corresponding to the target prosodic phrase after the speech synthesis processing thread receives the target prosodic phrase.

19. The storage medium of claim 18, wherein the taking each of the prosodic phrases as the target prosodic phrase to transmit in the order of the position of the prosodic phrase in the input text to the prosody prediction processing thread for processing comprises:

performing an index numbering processing on each of the prosodic phrases in the order of the position of the prosodic phrase in the input text so that each of the prosodic phrases corresponds to a unique index number; and taking each of the prosodic phrases as the target prosodic phrase to transmit in the order of the index number to the prosody prediction processing thread for processing, and stopping transmitting the target prosodic phrase to the prosody prediction processing thread in response to the index number being determined as a maximum number.

20. The storage medium of claim 17, wherein the synthesizing the short sentence audios according to the prosodic phrases by performing the streamed speech synthesis processing on each of the prosodic phrases in the input text in the manner of asynchronous processing of the thread pool further comprises:

obtaining a thread queue for performing the streamed speech synthesis processing on each of the prosodic phrases in the input text by connecting the prosody prediction processing thread, the phoneme prediction processing thread, the phoneme duration prediction processing thread, and the speech synthesis processing thread in the thread pool in a sequential manner.

* * * * *